US008871851B2

(12) United States Patent
Prince et al.

(10) Patent No.: US 8,871,851 B2
(45) Date of Patent: *Oct. 28, 2014

(54) THERMOPLASTIC COMPOSITION WITH FLY ASH MATERIAL

(75) Inventors: Jack Raymond Prince, West Bountiful, UT (US); Jared Lee Sommer, North Salt Lake City, UT (US)

(73) Assignee: Revolutionary Plastics, LLC, Las Vegas, NV (US)

( * ) Notice: Subject to any disclaimer, the term of this patent is extended or adjusted under 35 U.S.C. 154(b) by 647 days.

This patent is subject to a terminal disclaimer.

(21) Appl. No.: 13/018,222

(22) Filed: Jan. 31, 2011

(65) Prior Publication Data

US 2011/0144243 A1    Jun. 16, 2011

Related U.S. Application Data

(63) Continuation of application No. 11/864,968, filed on Sep. 29, 2007, now Pat. No. 7,879,939, which is a continuation of application No. PCT/US2006/011367, filed on Mar. 29, 2006.

(60) Provisional application No. 60/666,134, filed on Mar. 29, 2005.

(51) Int. Cl.
*C08K 3/34* (2006.01)
*C08K 3/22* (2006.01)

(52) U.S. Cl.
CPC .................................. *C08K 3/22* (2013.01)
USPC .......................................... 524/442; 524/443

(58) Field of Classification Search
USPC .................................................. 524/442, 443
See application file for complete search history.

(56) References Cited

U.S. PATENT DOCUMENTS

| | | | |
|---|---|---|---|
| 3,981,840 A | 9/1976 | Yamamoto et al. | 260/42 |
| 4,013,616 A | 3/1977 | Wallace | 260/42.46 |
| 4,243,575 A | 1/1981 | Myers et al. | 260/37 |
| 4,661,533 A | 4/1987 | Stobby | 521/122 |
| 4,968,463 A | 11/1990 | Levasseur | 264/40.1 |
| 5,071,891 A | 12/1991 | Harrison et al. | 523/209 |
| 5,158,725 A | 10/1992 | Handa et al. | 264/40 |
| 5,177,139 A | 1/1993 | Klaar et al. | 524/484 |
| 5,302,634 A | 4/1994 | Mushovic | 523/219 |
| 5,338,609 A | 8/1994 | Ondrus et al. | 428/402 |
| 5,366,365 A | 11/1994 | Sullivan et al. | 425/144 |
| 5,369,147 A | 11/1994 | Mushovic | 523/219 |
| 5,508,315 A | 4/1996 | Mushovic | 521/122 |
| 5,552,455 A | 9/1996 | Schuler et al. | 523/137 |
| 5,604,266 A | 2/1997 | Mushovic | 521/122 |
| 5,851,469 A | 12/1998 | Muller et al. | 264/177.1 |
| 5,886,078 A | 3/1999 | Sullivan et al. | 524/449 |
| 6,242,098 B1 | 6/2001 | Styron et al. | 428/402 |
| 6,269,952 B1 | 8/2001 | Watt et al. | 209/3 |
| 6,344,268 B1 | 2/2002 | Stucky et al. | 428/317.9 |
| 6,362,252 B1 | 3/2002 | Prutkin | 523/200 |
| 6,583,217 B1 | 6/2003 | Li et al. | 524/650 |
| 6,669,773 B2 | 12/2003 | Malloy et al. | 106/705 |
| 6,695,902 B2 | 2/2004 | Hemmings et al. | 106/284.05 |
| 6,831,118 B2 | 12/2004 | Munzenberger | 523/218 |
| 6,916,863 B2 | 7/2005 | Hemmings et al. | 523/218 |
| 7,241,818 B2 | 7/2007 | Hemmings et al. | 523/21.8 |
| 7,879,939 B2 * | 2/2011 | Prince et al. | 524/442 |
| 8,106,105 B2 | 1/2012 | Cernohous | 521/83 |
| 2002/0040084 A1 | 4/2002 | Colmar et al. | 524/430 |
| 2002/0171164 A1 | 11/2002 | Halterbaum et al. | 264/53 |
| 2002/0185769 A1 | 12/2002 | Hasegawa et al. | 264/51 |
| 2003/0032707 A1 | 2/2003 | Hemmings et al. | 524/425 |
| 2003/0083156 A1 | 5/2003 | Pasqua, Jr. et al. | 473/376 |
| 2003/0092816 A1 | 5/2003 | Mehta et al. | 524/445 |
| 2004/0266933 A1 | 12/2004 | Friedman et al. | 524/442 |
| 2005/0133960 A1 | 6/2005 | Keller et al. | 264/328.6 |
| 2006/0058427 A1 | 3/2006 | O'Neill et al. | 523/319 |
| 2006/0099405 A1 | 5/2006 | Guiselin et al. | 428/323 |
| 2007/0142534 A1 | 6/2007 | Moad et al. | 524/445 |
| 2008/0029925 A1 | 2/2008 | Brown | 264/166 |
| 2008/0114112 A1 | 5/2008 | Hemmings et al. | 524/425 |
| 2009/0130443 A1 | 5/2009 | Lustiger | 428/401 |
| 2010/0016459 A1 | 1/2010 | Cernohous | 521/146 |
| 2010/0119751 A1 | 5/2010 | Lanier | 428/36.9 |
| 2011/0071252 A1 | 3/2011 | Prince et al. | 524/567 |
| 2011/0130501 A1 | 6/2011 | Prince et al. | 524/147 |

FOREIGN PATENT DOCUMENTS

| | | | |
|---|---|---|---|
| AU | 2009200846 | 3/2009 | |
| EP | 0640650 | 1/1995 | C08L 23/16 |
| WO | WO 2009136185 | 11/2009 | C08K 3/00 |

OTHER PUBLICATIONS

Patent Cooperation Treaty, International Search Report and Written Opinion issued in PCT/US12/039697, date of mailing, Dec. 28, 2012 (15 pgs).
Patent Cooperation Treaty, International Search Report and Written Opinion issued in PCT/US12/066641, date of mailing, Feb. 19, 2013 (12 pgs).
Patent Cooperation Treaty, International Search Report and Written Opinion issued in PCT/US12/055065, date of mailing, Mar. 27, 2013 (10 pgs).
Patent Cooperation Treaty, International Preliminary Report on Patentability, date of mailing, Aug. 16, 2007 (4 pgs).
Chinese Office Action and translation submitted by the State Intellectual Property Office, issued on Apr. 15, 2010 (12 pgs).

(Continued)

*Primary Examiner* — Edward Cain
(74) *Attorney, Agent, or Firm* — Hayes Soloway P.C.

(57) ABSTRACT

Strengthened thermoplastic materials use fly ash or cinders as extenders. The extended materials use fly ash or cinders that preferably contain no more than about 2% by weight of moisture. The thermoplastic materials are preferably foamed and extruded to form extruded closed cell foam articles, for example a window blind slat, shutter louver, shutter stile, or shutter frame. Thermoplastic materials formed with the fly ash or cinders can also be formed into non-foamed products or into pellets for use in later extruding to form products.

17 Claims, 4 Drawing Sheets

(56) References Cited

OTHER PUBLICATIONS

Chinese Office Action and translation submitted by the State Intellectual Property Office, issued on Dec. 16, 2010 (7 pgs).

Chinese Office Action and translation submitted by the State Intellectual Property Office, issued on Mar. 16, 2011 (8 pgs).

Chinese Office Action and translation submitted by the State Intellectual Property Office, issued on Apr. 27, 2011 (10 pgs).

Wong & Truss "Effect of Flyash Content and Coupling Agent on the Mechanical Properties of Flyash-Filled Polypropylene", Composites Science and Technology 52 (1994), 361-368.

Schut, "Fly-Ash Fille Stages a Comeback" Article, Plastics Technology, Sep. 1999 Issue (2 pgs).

Nath et al., "Novel Observations on Kinetics of Nonisothermal Crystallization in Fly Ash Filled Isotactic-Polypropylene Composites", Published online Oct. 7, 2009 in Wiley InterScience, Journal of Applied Polymer Science, vol. 115, 1510-1517 (2010).

Shoup, Chevron Phillips Chemical Company LP, "Injection Moulding Fractional Melt Index, High Density Polyethylene Materials", (17 pgs), (Date Unknown).

"New plant makes additives from power station waste", Compounding World, Oct. 2009 (1 pg. article).

Xanthos, "Functional Fillers for Plastics", Wiley-VCH Verlag GmbH & Co. KGaA, (89 pgs), Copyright 2005.

Polyolefin Wikipedia Article (2 pgs) http://en.wikipedia.org/wiki/Polyolefin , May 2, 2011 last modified on Wikipedia.

Rohatgi et al., "Compressive and ultrasonic properties of polyester/fly ash composites", J Mater Sci (2009) 44:1485-1493.

A. Brent Strong, "Plastics Materials and Processing", Third Edition, (21 pgs), $3^{rd}$ Edition, Copyright 2006.

A. Brent Strong, "Fundamentals of Composites Manufacturing Materials, Methods, and Applications", Second Edition, (4 pgs) $2^{nd}$ Edition, Copyright 1996.

Heat Transfer—Japanese Research, vol. 36 Issue 7, Oct. 17, 2007, Wiley Periodicals, 3 Abstracts (3 pgs).

Srivastava et al., "Tensile and fracture properties of epoxy resin filled with flyash particles", Journal of Materials Science 25 (1990) 3513.

Fujimo et al., "Experimental Investigation on the Thermal Conductivity Measurement of the Fly Ash Dispersed Plastic Composite Using Guarded Hot Plate Apparatus", 2007.

Melt Mass Flow and Melt Volume Flow Rate—ASTM D1238: IDES—The Plastics Web (2 pgs) http://www.ides.com/property_descriptions/ASTMD1238.asp (Date Unknown).

ASTM D1238—10 Standard Test Method for Melt Flow Rates of Thermoplastics by Extrusion Plastometer—http://www.astm.org/Standards/D1238.htm, (4 pgs) (Date Unknown).

RockTron Technology Overview Presentation Slides, IGEM 2010, (78 pgs) (Date Unknown).

Barnes et al., "Ash Utilisation from Coal-Based Power Plants" (30 pgs), (2006).

\* cited by examiner

THERMOPLASTIC COMPOSITION WITH FLY ASH MATERIAL

CROSS REFERENCE TO RELATED APPLICATIONS

This application is a continuation of U.S. patent application Ser. No. 11/864,968 filed 29 Sep. 2007 which issued on 1 Feb. 2011 as U.S. Pat. No. 7,879,939 which is a continuation of International Application No. PCT/US2006/011367, filed Mar. 29, 2006 and entitled "Fly Ash and Cinder Strengthened Thermoplastic," which claims priority to U.S. Provisional Patent Application No. 60/666,1.34, filed Mar. 29, 2005 and entitled "Fly Ash Strengthened Thermoplastic," both of which are hereby incorporated by reference in their entireties.

BACKGROUND OF THE INVENTION

1. The Field of the Invention

This invention relates to structurally strengthened thermoplastics.

2. The Relevant Technology

Wood has long been a favorite building material. Wood is also commonly used in the manufacture of products such as decorative moldings and frames and window coverings such as window shutters and wooden blind slats. Wooden slats and louvers are relatively high in strength and do not typically bend or sag or deform. Wooden window blind slats and other wood products such as frames and moldings are becoming quite expensive due to the increasing cost of wood and labor. There is a long felt need to find alternatives to wood that are lower in cost and easier to manufacture while retaining properties and characteristics of wood (e.g. weight/density, paintability and structural strength).

Wood substitutes are known. For example, U.S. Pat. No. 6,083,601 (Prince) discloses a Venetian blind slat formed of a dried wood byproduct (cellulose, or wood powders) and plastic. U.S. Pat. No. 6,583,189 (King) discloses articles, such as thermoplastic window covering products and window shutter components, containing a thermoplastic strengthened with dried diatomaceous earth.

Still, there is a continuing need to find new alternatives to wood that involve less plastic than conventional wood substitutes to reduce cost while retaining many of the benefits of the plastic material.

BRIEF SUMMARY OF THE INVENTION

A thermoplastic material is strengthened with fly ash or cinders and is especially useful for thermoplastic window covering products, such window blind slats, and window shutter components such as shutter louvers, shutter stiles, and shutter frames.

According to the invention, the article can be made of a closed cell foam thermoplastic or a substantially solid thermoplastic (not foam) strengthened with fly ash containing no more than about 2% by weight of moisture. In a preferred embodiment of the invention, a closed cell foam of a first thermoplastic contains between about 1% and 40% of fly ash or cinders by weight. The material may then be formed or processed into desired articles like window shutter components. The cinders may be of a suitable size selected so that the cinders do not result in a surface that is rough or discolored.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF A PREFERRED EMBODIMENT

The process of this invention can be utilized with any moldable plastic material. As used herein and in the claims, the term "plastic" is intended to include any natural or synthetic polymeric material, such as thermoplastic or thermoplastic resins, which can be molded into a desired final shape using heat and/or pressure. Examples of such materials are: ABS resins, ASA resins, ionomers, nylons, polyarylene oxides, polyolefins, styrene polymers and copolymers such as styrene/butadiene, vinyl polymers and copolymers such as poly(vinyl chloride), poly(vinyl fluoride), vinylidene chloride/vinyl chloride copolymer, and the like, including blends, and recycled, impure plastics.

The terms "mold," "molded," "moldable," "molding" and the like as used herein and in the claims is intended to include any plastic forming process such as film formation by extrusion, casting, or calendering, blow molding, injection molding, extrusion, vacuum forming, pressure forming, compression molding, transfer molding, and the like.

Figure 1:
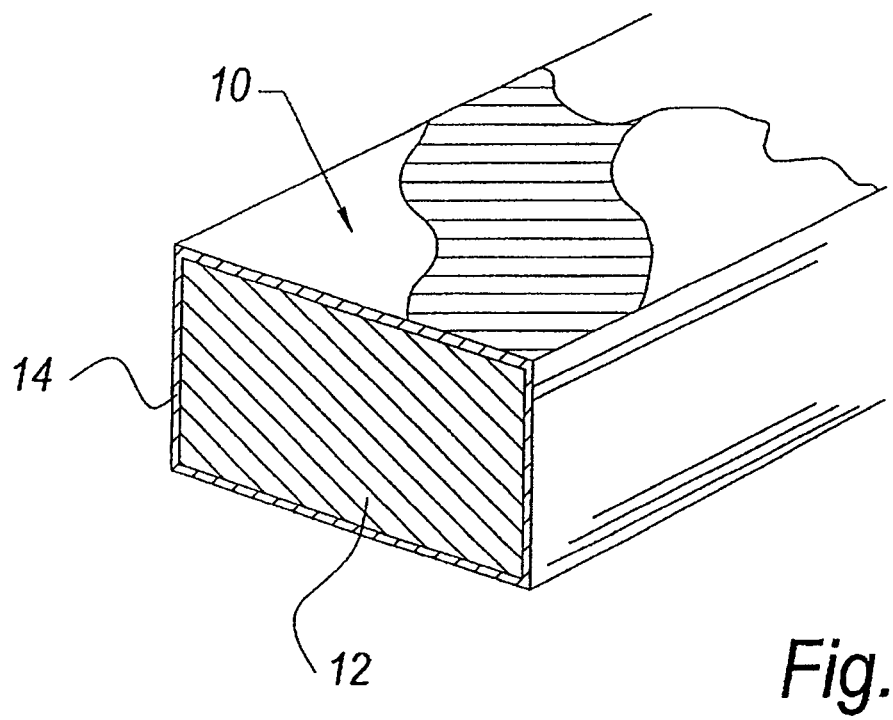
FIG. 1 depicts a partially cutaway perspective view of an extruded product having a foam core surrounded and fully enclosed by a protective cladding.

FIG. 1 illustrates a window shutter frame profile 10 formed as an extruded product having a closed cell foam core 12 surrounded and fully enclosed by a thermoplastic protective cladding 14.

Figure 2:
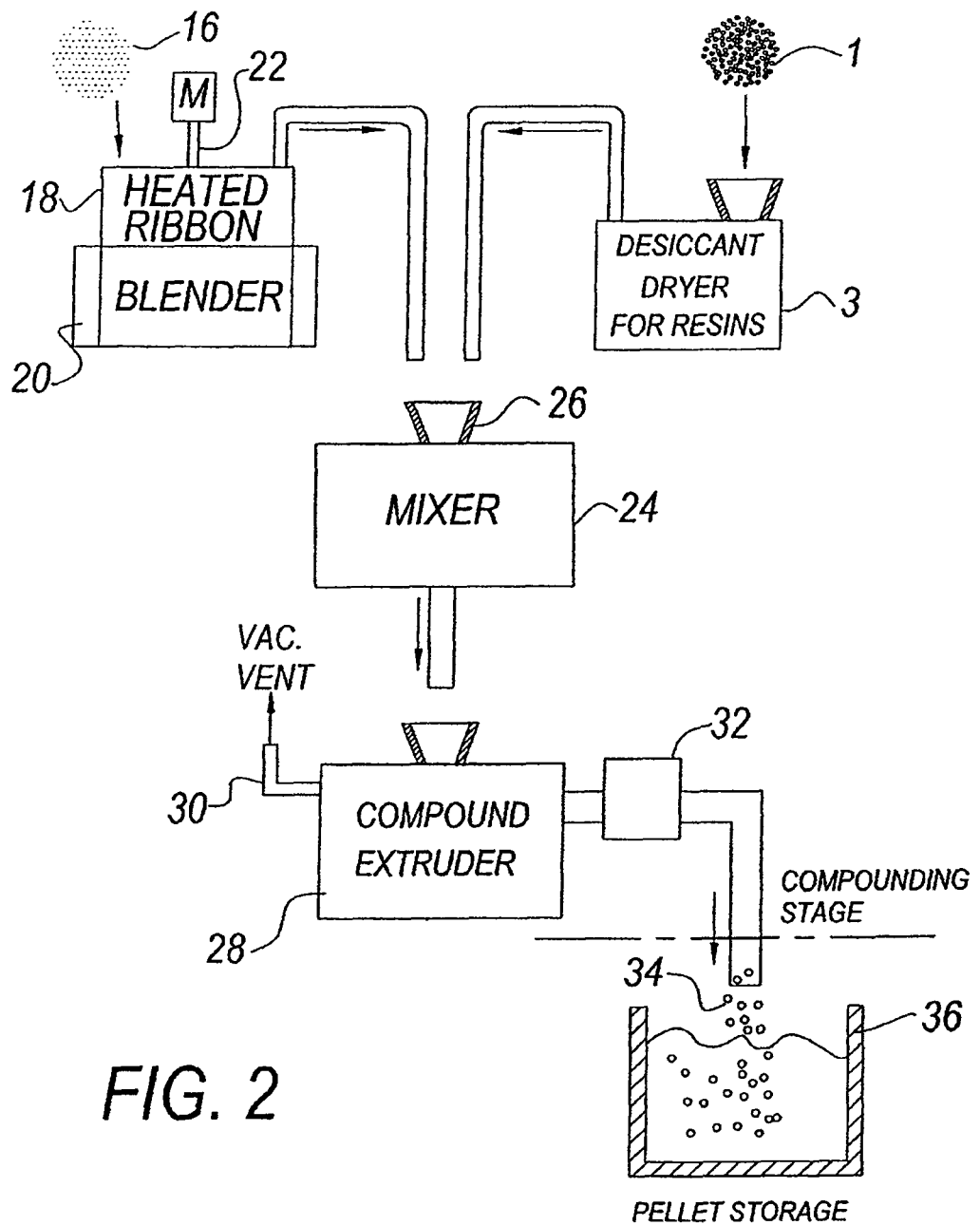
FIG. 2 schematically illustrates the structures involved in implementing the initial steps of the present invention directed to the product compounding stage.
Figure 3:
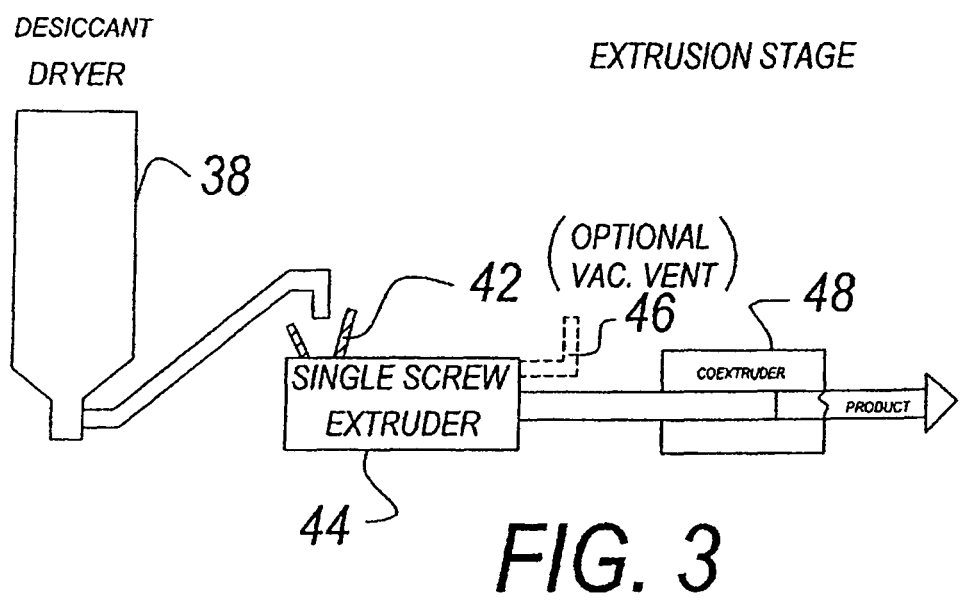
FIG. 3 schematically illustrates the structures involved in implementing the subsequent steps of the present invention directed to extruding a final product with a protective cladding.

FIGS. 2 and 3 and 3A schematically illustrate preferred structural components for implementing the process of the present invention.

In one preferred embodiment of this invention, a closed cell foam thermoplastic article is extruded. It is desirable that the resulting article has high impact and stiffness, light weight, high flexural strength, and a high flexural modulus, when compared to a substantially identical article without adding the fly ash or cinder strengthener to the thermoplastic.

The process begins with the procurement of fly ash, preferably smoke stack fly ash, or cinders having a relatively small particle size. Although optimum results are achieved with fly ash or cinders having a fine, small particle size, larger particle sizes are fully compatible with the process, as long as the maximum particle dimension is less than the minimum dimension of the extruded product.

The moisture content of the fly ash or cinders is preferably reduced to a level of less than about two percent, preferably less then 0.1 percent, and most preferably less than 0.05%. The foaming performance improves as the water content in the fly ash or cinders is reduced. At higher moisture contents, steam pockets are generated, and can destroy the aesthetics of the final product.

A variety of methods can be used to reduce the moisture content of the cinders or fly ash. Preferably, the fly ash or cinder component can be procured with a moisture content of less than five to seven percent. The present invention works acceptably when the cinder or fly ash initially contains either a higher or lower moisture content. However, the process can be implemented most efficiently and most cost effectively when the moisture content of the cinder or fly ash component does not exceed five to seven percent.

In FIG. 2, the powdered fly ash or cinder material 16 is first placed within a ribbon blender 18, which is surrounded by heating element 20 and which further includes motor driven mixer 22 for mixing and circulating the fly ash 16 to improve the uniformity of heating and to facilitate removal of moisture (e.g., means for drying).

In one implementation of the process of the present invention, the heater is set so that the temperature of the fly ash or cinders is raised to a level at which wood based materials would degrade and change color, generally above about 230° Fahrenheit, preferably above about 300° Fahrenheit, and more preferably above about 350° Fahrenheit. The fly ash or cinders can even be heated to about 400° Fahrenheit. The blender 18 is operated for a time adequate to reduce the moisture content of fly ash or cinders 16 to a level of less than 2 percent, preferably less than about 0.5 percent, more preferably less than about 0.1 percent, and most preferably less than about 0.05%.

Depending on the type of thermoplastic resin used, it might also be necessary to first heat and dry the resin in the compounding stage as shown in FIG. 2. The temperature to which the thermoplastic may be heated, for the purpose of drying, would depend on the heat softening characteristics of the type of plastic. If the resin is ABS, 4 hours of drying at 200° Fahrenheit, using a desiccant dryer (using recycled hot air blown over a desiccant bed), would likely be adequate. Generally, resin pellets require pre-drying as described, and powdered plastics do not. As shown in FIG. 2, as necessary, the thermoplastic resin 1 is placed into the inlet of desiccant dryer 3. Alternatively, this predrying step may be omitted if the thermoplastic material is relatively dry (less than 1% moisture), or if it is in powdered form. If a pre-drying step is used, it is preferred that the dryer temperature be set at below the softening point of the plastic, so that the particles do not stick together or agglomerate.

As illustrated in FIG. 2, the dried fly ash or cinders 16 is transferred from blender 18 to mixer 24, preferably while still hot. The thermoplastic resin 1, pre-dried as necessary, is also added. Mixer 24 does not need to be heated. Preferably, a horizontal ribbon blender is used, but other types can also suffice. In mixer 24, various other chemical components are added through input port 26 to blend the components into a relatively homogeneous mixture.

The fly ash and cinders, individually or combined, preferably amount to from about 1% to about 40% by weight of the compositions, more preferably from about 10% to about 20%, still more preferably about 15%. Table 1 below identifies the various components that are blended together within mixer 24, their typical component concentration ranges, the specifications for the preferred formulation and the identity of the specifically preferred components:

TABLE 1

| Concentration Ranges by Weight | Typical % by Weight | Generic Component Identifier |
|---|---|---|
| 1-40% | 15% | fly ash and/or cinders |
| 60-99% | 85% | thermoplastic resin |
| 0.01-3% | 0.03% | coupling agent |
| 0.01-2% | 0.2% | fatty acid (lubricant) |

The approximate percentages of the above components should be adjusted, as appropriate, to equal and not exceed 100%.

The fly ash is preferably a fine mesh smoke stack fly ash having a moisture content of less than about 5% (before drying).

The cinders also have a moisture content of less than 5% (before drying). The cinders are the byproduct of combusting a material such as coal. The cinders are preferably small so that the formed or extruded product has a smooth surface that is not notably changed from the color selected when selecting the plastic. In some cases the cinders and the fly ash can be combined in a desired ratio. That is, cinders can be substituted for fly ash and vice versa.

The thermoplastic resin is preferably ABS (acrylonitrile butadiene styrene).

The coupling agent component performs the function of increasing the compatibility of the fly ash or cinders and resin components to enhance the homogeneity of the final product. The preferred composition is a blend of fatty acid, metal soap, amide, and ethyl bis-stearamide.

The fatty acid component typically takes the form of stearic acid, although any equivalent fatty acid or animal fat, commonly referred to as tallow, could be readily substituted for stearic acid. The fatty acid component can be entirely eliminated, although when present it facilitates the blending of the fly ash or cinders with the plastic components.

The use of such coupling agents, fatty acids, and optionally additional oxidizers, in the compounding of thermoplastics for extrusion is well known in the art, and many formulations are available commercially.

The thermoplastic resin component can also be selected from polyvinyl chloride (PVC), polystyrene (PS), polypropylene (PP), acrylonitrile butadiene styrene (ABS), or acrylic-styrene-acrylonitrile (ASA). Other engineering thermoplastics or plastic blends are also suitable. Examples include polycarbonate, nylon, and blends of ABS-PVC, ABS-polycarbonate, and ABS-polyurethane. The base resins can be supplied in powder form or pellet form or as a blend of the two forms. The particular physical form is typically selected on the basis of lowest cost because no significant performance difference between the forms has been observed. The weight percentage concentration of the thermoplastic material is determined in response to the weight percentage concentrations of the other components so that the overall formulation yields a one hundred percent weight concentration.

Another preferred choice of thermoplastic material can be recycled plastics. In general, recycled plastic materials because of potential contaminants (such as paper, glue, or other plastics) can provide unpredictable extrusion performance, and their use is not favored when preparing many plastic articles. However, in the current application, the use of recycled plastics or blends of new and old plastics in fly ash or cinders reinforced plastics for window coverings provides satisfactory performance, and offers significant cost savings. The added stiffness and other favorable flexural characteristics provided by the fly ash or cinders, permits the use of low cost recycled plastics, to yield finished window covering products with desired performance characteristics.

More specifically, the use of recycled plastics, which are scraps and cuttings from the further processing of the finished extruded products previously manufactured as described herein, has cost benefits. The use of recycled plastics allows for greater cost recovery by reusing cuttings and scrap materials from the shop floor. For example, after the extruded products, which may be window shutter frame elements, or window shutter louvers and stiles, or window blind slats, are assembled into finished window covering products, such as shutters and blinds, the remaining cuttings and scraps, which require disposal, can now be recycled as feed for the process shown in FIG. 2, after they are properly cleaned and chopped up. The recycled scraps can also be blended with new plastics, for example in a 30(recycled)/70(new or virgin materials) blend, to yield significant cost savings.

FIG. 2 further illustrates that the blended output from mixer 24 is transferred into compounding extruder 28. The extruding zones and the die zones within extruder 28 in a preferred embodiment are heated to a temperature of about 370° Fahrenheit. The output flow rate of mixer 24 is coordinated with the operating speed of extruder 28 in a manner well known to those of ordinary skill in the art.

Optionally, vacuum port 30 as shown in FIG. 2 is typically operated at a vacuum of about twenty-three to twenty-five inches of mercury and functions to extract additional moisture from the compressed, heated and extruded mixture. Vacuum port 30 assists in reducing the moisture content of the mixture to the two percent maximum moisture content objective. The amount of moisture actually extracted through vacuum vent 30 varies as a function of process speed. The slower the process speed, the greater the degree of control and ability available to achieve the ultimately desired product moisture content.

As shown in FIG. 2, the output from extruder 28 is fed to a conventional pelletizer 32. A Gala underwater pelletizer, from Gala Industries, Inc., of Eagle Rock, Va., has been found effective for this purpose. The pellets 34, which are compounded pellets ready for product extrusion, discharged into pellet storage bin 36 typically have a diameter of approximately one eighth inch and a length of about one quarter inch, with a preferred moisture content of less than 0.5% by weight, and more preferably less than 0.2% by weight, and most preferably less than 0.15% by weight.

The compounded pellets can be used directly in the extrusion stage shown in FIG. 3, or they can be stored for future use. In general, it is found that after such compounding, the pellets will only pick up surface moisture, which can be rather easily removed by heating, such as by using a desiccant dryer.

Referring to FIGS. 2-3, the output of pellet storage bin 36 is preferably transferred to a heated dryer 38, which can be a desiccant dryer, preferably maintained at a temperature of about 200° Fahrenheit. Four (4) hours at 200° Fahrenheit is generally adequate for drying the compounded pellets, prior to the extrusion of the final product.

Referring to FIG. 3, the foaming agent, in metered quantities of at least about 0.05% but less than 3% of the total charge to extruder 44 is added via inlet port 42 or a similar port. The foaming agent, also commonly referred to as a blowing agent, performs the important function of allowing the heated, extruded material to expand while maintained in a heated state to fully occupy the predetermined, desired product profile. The preferred foaming agents are Foamazal 91, or XO130, or a blend of the two, both marketed by Bergen International of Rochelle Park, N.J. Foamazal 91 is endothermic and XO130 is exothermic. The foaming agent concentration, and the blend of endothermic and exothermic components can be varied as appropriate, as suggested by the manufacturer, to achieve the desired foam extrusion product profile. One example of a blend that works well with the example given above, for foamed ABS, in making a number of window blind slats is a 20/80 blend of Foamazal 91 (20%) and XO130 (80%), at a metered quantity of about 0.5% of the total charge.

In implementing the process as shown in FIG. 2-3, it has been found that if the moisture content of the compounded pellets 34 is kept below 0.2%, and more preferably below 0.15%, the user can employ a low cost conical single screw extruder 44 for the product extrusion step. The moisture can again be measured using "loss on drying" type moisture analyzers, such as the Mark 2 Moisture Analyzer mentioned above. Optionally, extruder 44 can also be fitted with a conventional vacuum port 46 (shown in broken lines in FIG. 3), although if the moisture of the compounded pellets are sufficiently low as described above, no vacuum should be needed. Vacuum port 46 can be operated at a vacuum level of about twenty-three to twenty-five inches of mercury, and this operation aids in maintaining the moisture content of the extruded product at the desired low level.

In a single barrel extruder for the product, there can be 3 or 4 barrel zones. In a 3 barrel zone arrangement, the temperatures in the zones (zone 1, zone 2, and zone 3) could be at about 300°, 330°, and 350° Fahrenheit. In a 4 barrel zone arrangement, temperatures of about 290°, 310°, 330°, and 350° Fahrenheit in the zones (zone 1 through 4) would work well. These temperatures can be varied by as much as 10%, depending on the volumes extruded, and the ambient temperature.

The use of thermoplastics filled with wood powders requires twin screw extruders with vacuum, which can cost several times more than a single screw extruder without vacuum, or more. The capital cost savings with the current process can thus be very significant.

Where it is desirable to have a protective cladding on the surface of the extruded article, a co-extruder 48, as shown in FIG. 3, can be used. Co-extrusion of thermoplastic articles is well known to one of ordinary skill in the art, and conventional co-extrusion methods can be used satisfactorily. Other conventional co-extrusion methods, for both thermoplastic foams and substantially solid thermoplastics, would also be suitable.

Figure 4:
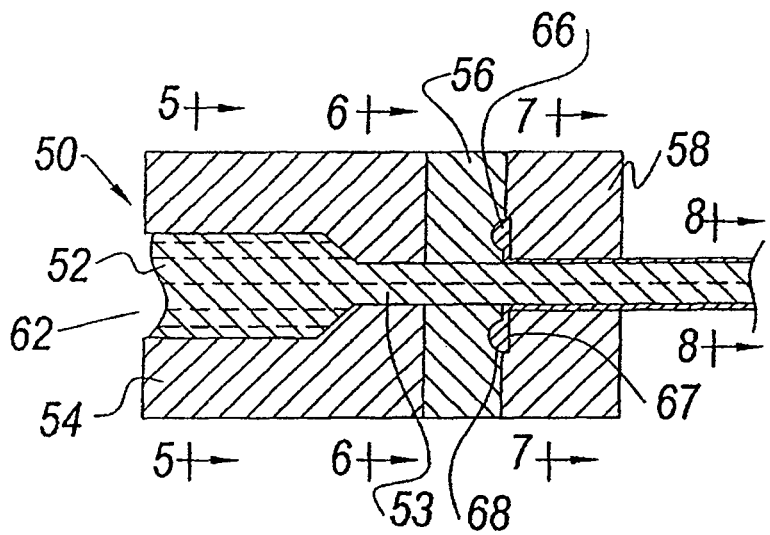
FIG. 4 is a sectional view of the co-extrusion die for extruding the thermoplastic protective cladding around a core of the extrudable mixture.

Co-extruder 48, as shown in FIG. 3, includes both an extruder, such as a Davis standard single screw extruder, and an extruder die, such as co-extruder die 50 illustrated in FIG. 4. FIGS. 4-8 illustrate a first and preferred embodiment of the co-extrusion process where the extrudable mixture provided by extruder 44 is co-extruded with an appropriate thermoplastic cladding or coating material. The charge 52 of fly ash or cinders strengthened plastic is shaped by a first extrusion element 54 of co-extruder die 50, into the desired geometric configuration. In a second extrusion element 56 and a third extrusion element 58 of the die 50, the thermoplastic cladding layer is co-extruded around the resulting foam core.

In the preferred embodiment of the invention, the average temperature of co-extrusion die elements 54, 56, and 58 are maintained at temperatures of about 350° Fahrenheit.

Figure 5:
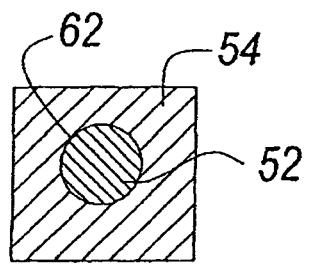
FIG. 5 is a sectional view of the co-extrusion die illustrated in FIG. 4, taken along section lines 5-5 in FIG. 4.
Figure 6:
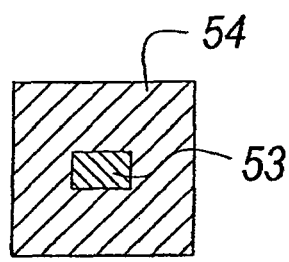
FIG. 6 is a sectional view of the co-extrusion die illustrated in FIG. 4, taken along section lines 6-6 in FIG. 4.
Figure 7:
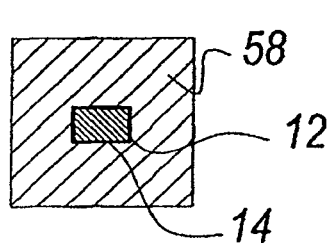
FIG. 7 is a sectional view of the co-extrusion die illustrated in FIG. 4 taken along section lines 7-7 in FIG. 4.
Figure 8:
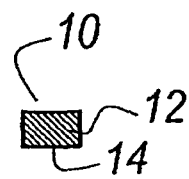
FIG. 8 is a sectional view of the extruded product having a fly ash or cinder reinforced plastic core surrounded and fully enclosed by a protective cladding as illustrated in FIG. 4, taken along section lines 8-8 in FIG. 4.

Referring to FIGS. 4-8, co-extrusion die 50 includes a first extrusion element 54, a second extrusion element 56, and a third extrusion element 58. In first extrusion element 54, the extruded foam core material 52 received from extruder 44 passes through cylindrical passageway 62 (as illustrated in FIG. 5), and generally transitions from a cylindrical cross sectional configuration (as illustrated in FIG. 5) to the desired profile or configuration (as illustrated in FIG. 6), as extruded foam core 53. Second extrusion element 56 has a generally ring shaped channel 66, on its surface facing third extrusion element 58, the channel 66 spaced circumferentially apart from the extrusion bore of element 58. Third extrusion element 58 has a ring shaped, flat depression 67 (the depression can be as shallow as about 0.010 in to about 0.050 in) on its face adjacent second extrusion element 56; the depression reaches and is coextensive with the outside of the extrusion bore of third extrusion element 58. Channel 66 and depression 67 cooperate to form a ring-shaped cavity 68 between extrusion elements 56 and 58. This cavity 68 receives, stores and co-extrudes a thermoplastic material around the entire circumference of extruded foam core 53 (see FIG. 7). These "rings" mentioned in this example may conform generally to the shape of the extrusion bore (in this example rectangular), and therefore need not be circular in shape.

The output from the third extrusion element 58 possesses the desired final product configuration, in the present case a rectangular shaped extruded product compatible for use as elements for window shutter frames. The continuous product fed from the output port of co-extrusion die 50 is cut to appropriate lengths in response to customer requirements. Of course other profiles and shapes can be produced, depending on consumer demand. Such products can include, for example, window covering products such as window blind slats, elements and components for building window shutters such as window shutter louvers, stiles, and frames, and other elongated articles.

The thermoplastic material co-extruded from ring shaped cavity 68 can be formulated to be ultraviolet (UV) stable, without subsequent painting, to prevent yellowing or change of color when exposed to sunlight for long periods of time. In certain applications, it is desirable to add pigments to the thermoplastic material to avoid the necessity for painting the exposed surface of the thermoplastic cladding material. Other applications, painting can be desirable, and appropriate formulation changes would be made. A wide range of thermoplastic materials are suitable for use as cladding material 14, including PVC, ABS and polycarbonate. Basically, any thermoplastic compatible with the base resin material of the extruded core can be used. Numerous other thermoplastic materials are well known to persons of ordinary skill in the art. A high grade material available from General Electric under the trademark GELOY plastic can be used as a high grade exterior plastic cladding material.

The thickness of cladding material 14 can be controlled in a variety of ways, including varying the co-extrusion pressure, as well as varying the speed of passage of the materials through co-extrusion die 50. Faster transit rates result in a thinner cladding material, while slower transit rates yield a thicker cladding material.

As a result of the action of the foaming agent, expansion of the extrudable mixture continues and is substantially complete within about three to four inches after discharge from the exit port of co-extrusion die 50. As a function of both time and distance, the extrudable material will have expanded to the desired final product configuration by that point.

Preferably the first thermoplastic, when extruded to form a thermoplastic foam, is expanded at least about 50%, more preferably at least about 75%, even more preferably at least about 100%, most preferably at least about 150%, but generally not more than about 400%.

At the point of desired expansion, window shutter frame element 10 enters a conventional vacuum cooling and sizing or shape calibrating machine (not shown) and is drawn through a conventional calibrating profile to conform the cross sectional profile of window shutter frame element 10 to the desired end product configuration. Within the calibration equipment, a vacuum of about sixteen to eighteen inches of mercury is preferably applied while the article is cooled by a shower or water held at a temperature of approximately 68° Fahrenheit.

Upon completion of the sizing and cooling operation within the calibration equipment, the continuous length of slat is cut to the appropriate customer-specified length, and used in further manufacturing steps (not the subject of this present application).

Figure 1A:
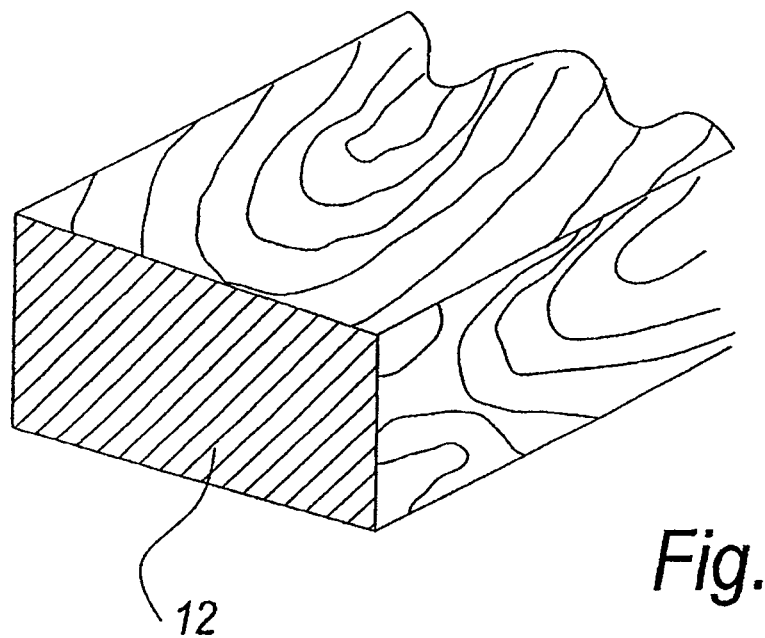
FIG. 1A is a perspective view of an extruded product having an unclad foam core, which has been embossed with a textured finish.

Optionally, the unclad foam profile can be passed through a conventional embossing machine well known in the art (not shown) to impart a desired surface texture, e.g. a wood grain, on the article, as part of the finishing process. FIG. 1A shows such an unclad article, with a wood grain embossed on the surface. For such unclad, foamed articles, it is generally desirable to add an anti-UV property enhancer such as pigment grade, finely powdered titanium dioxide to the plastic at the compounding stage, before pellet formation. A concentration of between about 1% to about 10% would be preferred, more preferably between about 4% to about 7%, and most preferably between about 5% to about 6%. However, adding too much anti-UV property enhancer increases the cost, and the weight of the product.

Although, the above description is directed to a closed cell foam, the same process can be used with solid plastics. The main difference is that no foaming or blowing agent is used at the product extruder. The resulting product or article, which is not foamed, is therefore substantially solid. Further, for solid plastic extrusion, the fly ash or cinders content in the extruded product can be relatively higher, and can be in the range between about 1% to about 70%, preferably between 5 to 55%, more preferably between 10-40%. It is theorized that fly ash or cinders of very low moisture content used as a strengthener, the thermoplastic remains extrudable, and the stiffness and flexural characteristics of the solid, unfoamed thermoplastic are also greatly enhanced. With these modifications (e.g. in the ranges of the weight percent of fly ash or cinders, and by replacing the description so that the extruded core is not foamed, but rather formed of a substantially solid thermoplastic) the above description directed to a closed cell foam shall also apply, and shall not be repeated here.

FIGS. 2 and 3 illustrate a structural embodiment that can implement the process or method of the present invention. Although a ribbon blender 18 has been illustrated as one device suitable for controllably reducing the moisture content of fly ash or cinders 16, a paddle blender or a tumble dryer can be substituted for blender 18 to accomplish the same objective. In another embodiment, blender 18 can be entirely eliminated, with the dried feeds of fly ash or cinders and the base resin going directly to the compound extruder.

While a single screw extruder 44 is shown as an example in FIG. 3, twin screw extruders, such as the conical twin screw extruders from Cincinnati Milacron, can also be used.

As another example of a method that can be used for the invention, while compounding is commonly used in extrusion, it is also possible, though not preferred, to skip the compounding step, and add the mixed ingredients (outlet from mixer 24) directly to the inlet port 42 of extruder 44.

While the description above is worded largely as related to extruded plastics, the process of this invention can be utilized with any moldable plastic material, and this invention should also be read as if the term "extruded" is replaced by the broader term "molded." The terms "mold," "molded," "moldable," "molding" and the like as used herein and in the claims is intended to include any plastic forming process such as film formation by extrusion, casting, or calendering, blow molding, injection molding, extrusion, vacuum forming, pressure forming, compression molding, transfer molding, and the like.

As used herein and in the claims, the term "plastic" is intended to include any natural or synthetic polymeric material, such as thermoplastic or thermoplastic resins, which can be molded into a desired final shape using heat and/or pressure. Examples of such materials are: ABS resins, ASA resins, ionomers, nylons, polyarylene oxides, polyolefins, styrene polymers and copolymers such as styrene/butadiene, vinyl polymers and copolymers such as poly(vinyl chloride), poly(vinyl fluoride), vinylidene chloride/vinyl chloride copolymer, and the like, including blends, and recycled, impure plastics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for forming a thermoplastic composition, said method comprising:
   providing a thermoplastic material which is in a form to be movable, dryable and mixable, said thermoplastic material having moisture present in or included therewith;
   providing a dryer for drying said thermoplastic material;
   supplying said thermoplastic material to said dryer;
   operating said dryer to dry said thermoplastic material to remove said moisture that is present with or in said thermoplastic material;
   providing fly ash material which is in a form to be moveable, dryable and mixable, said fly ash material being contaminated with moisture;
   providing means for drying said fly ash material;
   supplying said fly ash material to said means for drying said fly ash material;
   operating said means for drying to dry said fly ash material to remove said moisture that is present in or with said fly ash material;
   providing a mixer for mixing dried fly ash material and dried thermoplastic material;
   supplying said dried fly ash material and said dried thermoplastic material to said mixer;
   operating said mixer to mix said dried fly ash material with said dried thermoplastic material to form a thermoplastic composition; and
   supplying said thermoplastic composition from said mixer as an output.

2. The method of claim 1 further comprising:
   providing an extruder to heat and extrude said thermoplastic composition as a thermoplastic product;
   supplying said thermoplastic composition to said extruder; and
   operating said extruder to heat and extrude said thermoplastic composition as a thermoplastic product.

3. The method of claim 1 wherein said fly ash material is smoke stack fly ash.

4. The method of claim 1 wherein said fly ash material is fine fly ash.

5. The method of claim 1 wherein said fly ash material includes fine fly ash and fine cinders.

6. The method of claim 1 wherein said fly ash material is fine cinders.

7. The method of claim 1 wherein said dryer for drying said thermoplastic material includes means to heat said thermoplastic material.

8. The method of claim 7 wherein said means to heat is operated to heat the thermoplastic material to a temperature just below which the thermoplastic material softens and agglomerates.

9. The method of claim 7 wherein said means to heat includes a bed of dessicant and a blower to blow air relative to and between said thermoplastic material and said bed of dessicant.

10. The method of claim 7 wherein said means for drying said fly ash material includes a heater.

11. The method of claim 10 wherein said heater is operated to heat said fly ash material to a temperature from about 230 degrees Fahrenheit to about 400 degrees Fahrenheit.

12. The method of claim 10 wherein said heater is operated to supply heat to said fly ash material for a period of time to reduce the moisture content to below 2 percent.

13. A method for forming a thermoplastic composition, said method comprising:
   providing a thermoplastic material which is in a form to be moveable, dryable and mixable, said thermoplastic material being of the type that may include moisture;
   providing a dryer for drying said thermoplastic material;
   supplying said thermoplastic material to said dryer;
   operating said dryer to dry said thermoplastic material only as necessary to remove any said moisture that is present in or with said thermoplastic material to form dried thermoplastic material;
   providing fly ash material which is in a form to be moveable, dryable and mixable, said fly ash material being of the type that may include moisture;
   providing means for drying said fly ash material, said means for drying said fly ash material being operable to remove any of said moisture that may be present in or with said fly ash material;
   supplying said fly ash material to said means for drying said fly ash material;
   operating said means for drying said fly ash material as necessary to remove any said moisture to a level that is below 2% by weight to form dried fly ash material;
   providing a mixer for mixing dried fly ash material and dried thermoplastic material;
   supplying said dried fly ash material and said dried thermoplastic material to said mixer;

operating said mixer to mix said dried fly ash material with said dried thermoplastic material to form a thermoplastic composition; and supplying said thermoplastic composition from said mixer as an output.

14. A method for forming a composition, said method comprising:

providing a plastic material in a form to be movable, dryable and mixable;

drying said plastic material as needed to form dried plastic material;

providing fly ash material which is in a form to be moveable, dryable and mixable;

drying said fly ash material as needed to form fly ash filler; and mixing said fly ash filler and said dried plastic material to form a plastic composition, said fly ash filler comprising between 1% and 90% by weight of said composition.

15. The method of claim 14 further comprising:

heating and extruding said plastic composition to form a plastic product.

16. The method of claim 14 wherein said fly ash material is smoke stack fly ash.

17. The method of claim 14 wherein said fly ash material includes fine fly ash and fine cinders.

* * * * *